US012536386B2

(12) United States Patent
Zhao et al.

(10) Patent No.: US 12,536,386 B2
(45) Date of Patent: Jan. 27, 2026

(54) METHOD AND APPARATUS FOR PROCESSING MODEL DATA, ELECTRONIC DEVICE, AND COMPUTER READABLE MEDIUM

(71) Applicants: Beijing Wodong Tianjun Information Technology Co., Ltd., Beijing (CN); Beijing Jingdong Century Trading Co., Ltd., Beijing (CN)

(72) Inventors: Nan Zhao, Beijing (CN); Youzheng Wu, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

(*) Notice: Subject to any disclaimer, the term of this patent is extended or adjusted under 35 U.S.C. 154(b) by 157 days.

(21) Appl. No.: 18/029,342

(22) PCT Filed: Dec. 21, 2021

(86) PCT No.: PCT/CN2021/140074
§ 371 (c)(1),
(2) Date: Mar. 29, 2023

(87) PCT Pub. No.: WO2022/156468
PCT Pub. Date: Jul. 28, 2022

(65) Prior Publication Data
US 2023/0367972 A1 Nov. 16, 2023

(30) Foreign Application Priority Data
Jan. 21, 2021 (CN) .......................... 202110080903.5

(51) Int. Cl.
G06V 10/77 (2022.01)
G06F 16/45 (2019.01)
(Continued)

(52) U.S. Cl.
CPC .............. *G06F 40/40* (2020.01); *G06F 16/45* (2019.01); *G06F 40/284* (2020.01); *G06V 10/40* (2022.01);
(Continued)

(58) Field of Classification Search
CPC ........ G06F 40/40; G06F 40/284; G06F 40/30; G06F 16/45; G06V 10/40; G06V 10/7715; G06V 10/806; G06V 20/70
See application file for complete search history.

(56) References Cited

U.S. PATENT DOCUMENTS 10,467,274 B1 11/2019 Ren et al.
2020/0372369 A1 11/2020 Gong et al.
(Continued)

FOREIGN PATENT DOCUMENTS

| CN | 101226557 A | 7/2008 |
| CN | 110234018 A | 9/2019 |

(Continued)

OTHER PUBLICATIONS

Zheng et al., Deep and Autoregressive Approach for Topic Modeling of Multimodal Data, 2016, IEEE Transactions on Pattern Analysis and Machine Intelligence, 38(6): 1056-1069 (Year: 2016).*

(Continued)

*Primary Examiner* — Kathleen M Broughton
(74) *Attorney, Agent, or Firm* — Venable LLP; Henry J. Daley; Ryan T. Ward

(57) ABSTRACT

A method and apparatus for processing model data, which relate to the technical field of artificial intelligence. The method comprises: acquiring data of at least two different modalities in a to-be-processed dataset; performing feature extraction on the data of at least two different modalities, then splicing and/or superimposing same, and obtaining a feature sequence; performing model mapping on the feature
(Continued)

sequence, to obtain multi-modal input data adapted to an autoregressive model; and inputting the multi-modal input data into the autoregressive model, and obtaining a single-modal result outputted by the autoregressive model.

14 Claims, 5 Drawing Sheets

(51) Int. Cl.
*G06F 40/284* (2020.01)
*G06F 40/40* (2020.01)
*G06V 10/40* (2022.01)
*G06V 10/80* (2022.01)

(52) U.S. Cl.
CPC ........ *G06V 10/7715* (2022.01); *G06V 10/806* (2022.01)

(56) References Cited

U.S. PATENT DOCUMENTS

| | | | |
|---|---|---|---|
| 2020/0380211 A1 | 12/2020 | Fan et al. | |
| 2021/0303921 A1* | 9/2021 | Niu | G06F 40/30 |

FOREIGN PATENT DOCUMENTS

| | | | | |
|---|---|---|---|---|
| CN | 110263324 A | | 9/2019 | |
| CN | 110288980 A | | 9/2019 | |
| CN | 110490095 A | | 11/2019 | |
| CN | 110597878 A | | 12/2019 | |
| CN | 111258995 A | | 6/2020 | |
| CN | 111259148 A | | 6/2020 | |
| CN | 111259663 A | | 6/2020 | |
| CN | 111461203 A | * | 7/2020 | G06F 16/583 |
| CN | 111768367 A | | 10/2020 | |
| CN | 111898636 A | | 11/2020 | |
| CN | 112035401 A | | 12/2020 | |
| CN | 112148836 A | | 12/2020 | |
| CN | 112199952 A | * | 1/2021 | G06N 3/045 |
| JP | 2002158877 A | | 5/2002 | |
| JP | 2019-219827 A | | 12/2019 | |
| JP | 2020013272 A | | 1/2020 | |
| WO | 01/57805 A2 | | 8/2001 | |

OTHER PUBLICATIONS

Zhao et al., Convolutional Network Embedding of Text-Enhanced Representation for Knowledge Graph Completion, 2020, IEEE Internet of Things Journal, 8(23): 16758-16769. (Year: 2020).*
Wang et al., Enhanced Multi-Modal Recommendation Based on Alternate Training with Knowledge Graph Representation, 2020, IEEE Digital Object Identifier, 8(2020):213012-213026 (Year: 2020).*
Aggarwal et al., Multi-Modal Association based Grouping for Form Structure Extraction, 2020, IEEE Conference on Applications of Computer Vision, pp. 1-11. (Year: 2020).*
Yufeng et al., "The Design and Implementation of Mcai System Based On Multimedia Database", GSM, 1002-8331-(2001)18-0031-03, TP37.
Zheng et al., "A Deep and Autoregressive Approach for Topic Modeling of Multimodal Data", IEEE Transactions on Pattern Analysis and Machine Intelligence, (Jun. 2016), vol. 38, No. 6, pp. 1056-1069.
Notice of Allowance issued in Chinese Application No. CN113821652A on Oct. 13, 2025.

* cited by examiner

METHOD AND APPARATUS FOR PROCESSING MODEL DATA, ELECTRONIC DEVICE, AND COMPUTER READABLE MEDIUM

CROSS-REFERENCE TO RELATED APPLICATIONS

This patent application is a national stage of International Application No. PCT/CN2021/140074, filed on Dec. 21, 2021, which claims the priority of Chinese Patent Application No. 202110080903.5, filed on Jan. 21, 2021. Both of the aforementioned applications are hereby incorporated by reference in their entireties.

TECHNICAL FIELD

The present disclosure relates to the field of computer technology, in particular to the technical field of artificial intelligence, and more particularly, to a method and apparatus for processing model data, an electronic device, a computer readable medium, and a computer program product.

BACKGROUND

Existing dialogue system datasets are mostly single-modal datasets, the corresponding research on dialogue generation systems is subject to the limitations of the datasets, and the studied models are also single-modal. However, in practical application scenarios, questions from customers in dialogue systems are often multi-modal, such as text information+image information. This is because with the widespread use of smartphones, the customers prefer to take a picture and send it to customer service, and a picture is worth a thousand words to describe a problem in more detail. However, in the existing technology, there are no examples of combining multi-modal datasets with pre-trained single-modal language models.

SUMMARY

Embodiments of the present disclosure propose a method and apparatus for processing model data, an electronic device, a computer readable medium, and a computer program product.

In a first aspect, embodiments of the present disclosure provide a method for processing model data, and the method includes: acquiring data of at least two different modalities in a to-be-processed dataset; performing feature extraction on the data of at least two different modalities to obtain extracted features, and then splicing and/or superimposing the extracted features, to obtain a feature sequence; performing model mapping on the feature sequence, to obtain multi-modal input data adapted to an autoregressive model; and inputting the multi-modal input data into the autoregressive model, to obtain a single-modal result output by the autoregressive model.

In a second aspect, embodiments of the present disclosure provide an apparatus for processing model data, and the apparatus includes: an acquisition unit, configured to acquire data of at least two different modalities in a to-be-processed dataset; an extraction unit, configured to perform feature extraction on the data of at least two different modalities to obtain extracted features, and then splice and/or superimpose the extracted features, to obtain a feature sequence; an obtaining unit, configured to perform model mapping on the feature sequence, to obtain multi-modal input data adapted to an autoregressive model; and a processing unit, configured to input the multi-modal input data into the autoregressive model, to obtain a single-modal result output by the autoregressive model.

In a third aspect, embodiments of the present disclosure provide an electronic device including: one or more processors; and a storage apparatus storing one or more programs thereon, where the one or more programs, when executed by the one or more processors, cause the one or more processors to implement the method according to any implementations of the first aspect.

In a fourth aspect, embodiments of the present disclosure provide a computer readable medium storing a computer program thereon, where the computer program, when executed by a processor, implements the method according to any implementations of the first aspect.

In a fifth aspect, embodiments of the present disclosure provide a computer program product including a computer program, where the computer program, when executed by a processor, implements the method according to any implementations of the first aspect.

BRIEF DESCRIPTION OF THE DRAWINGS

By reading detailed description of non-limiting embodiments with reference to the following accompanying drawings, other features, objectives and advantages of the present disclosure will become more apparent.

DETAILED DESCRIPTION OF EMBODIMENTS

Embodiments of the present disclosure will be further described in detail below in conjunction with the accompanying drawings. It should be understood that detailed embodiments described herein are intended only to explain the relevant disclosure, rather than limiting the disclosure. In addition, it should also be noted that, for ease of description, only those parts that are relevant to the relevant disclosure are shown in the accompanying drawings.

It should be noted that embodiments of the present disclosure and features in the embodiments may be combined with each other on a non-conflict basis. Embodiments of the present disclosure will be described in detail with reference to the accompanying drawings.

Figure 1:
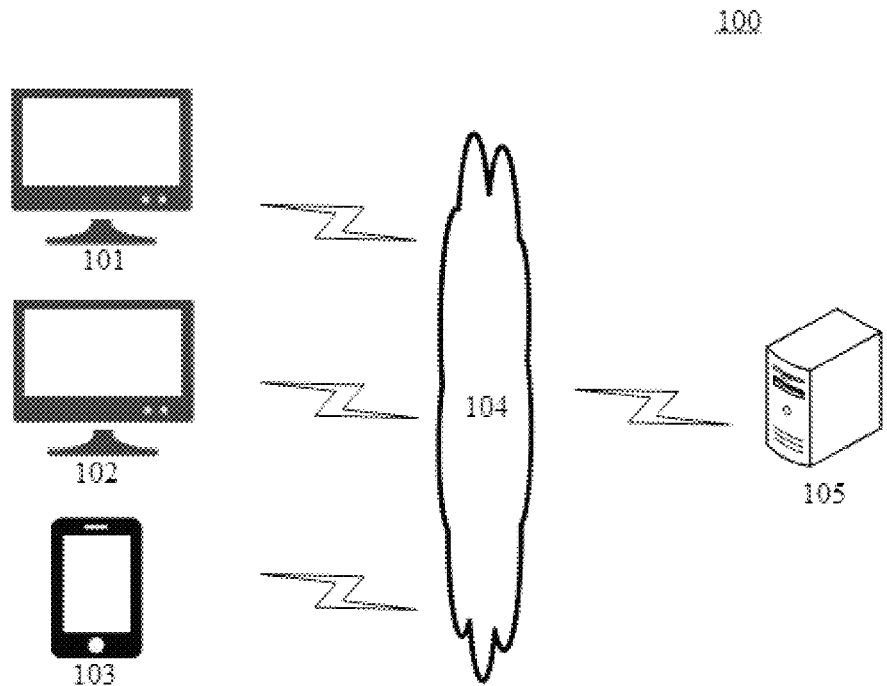
FIG. 1 is an exemplary system architecture diagram to which an embodiment of the present disclosure may be applied.

FIG. 1 shows an exemplary system architecture 100 to which a method for processing model data of the present disclosure may be applied.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

The terminal devices 101, 102, 103 interact with the server 105 via the network 104 to receive or send messages and so on. Various communication client applications, such as instant messaging tools, or email clients, may be installed on the terminal devices 101, 102, and 103.

The terminal devices 101, 102, and 103 may be hardware or software. When the terminal devices 101, 102, 103 are hardware, they may be user devices having communication and control functions, and the above user devices may communicate with the server 105. When the terminal devices 101, 102, 103 are software, they may be installed in the above user devices; the terminal devices 101, 102, 103 may be implemented as a plurality of software or software modules (e.g., software or software modules used to provide distributed services), or as a single software or software module, which is not specifically limited herein.

The server 105 may be a server that provides various services, such as a backend server for processing model data that provides support for a to-be-processed dataset in a client Q&A system on the terminal device(s) 101, 102, 103. The backend server may analyze and process relevant information to be input into an autoregressive model in the network, and feed back a processing result (e.g., a single-modal result output by the autoregressive model) to the terminal device(s).

It should be noted that the server may be hardware or software. When the server is hardware, it may be implemented as a distributed server cluster composed of a plurality of servers, or as a single server. When the server is software, it may be implemented as a plurality of software or software modules (e.g., software or software modules for providing distributed services), or as a single software or software module, which is not specifically limited herein.

It is noted that the method for processing model data provided by embodiments of the present disclosure is generally performed by server 105.

It should be understood that the numbers of terminal devices, network, and server in FIG. 1 are merely illustrative. Depending on the implementation needs, there may be any number of terminal devices, networks, and servers.

Figure 2:
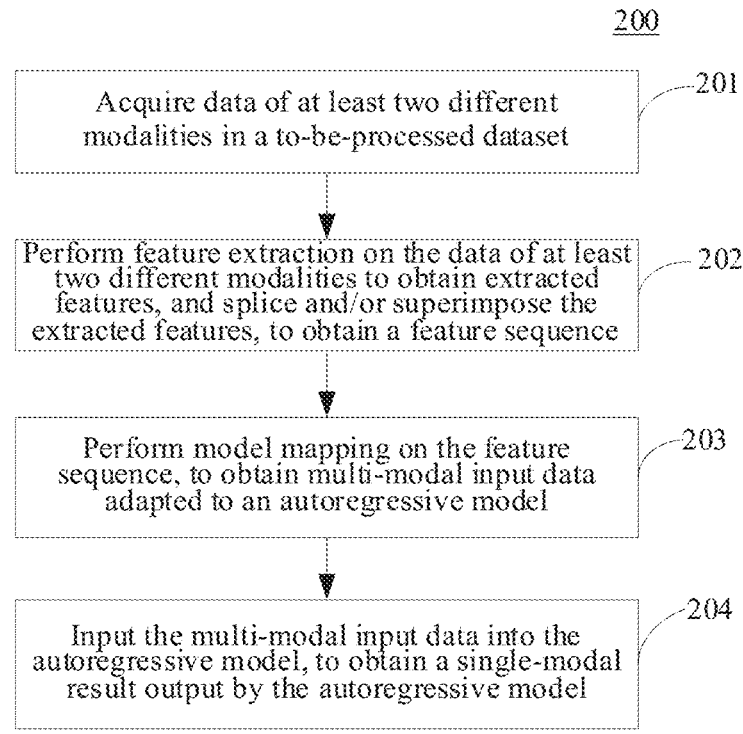
FIG. 2 is a flowchart of an embodiment of a method for processing model data according to the present disclosure.

As shown in FIG. 2, a flow 200 of an embodiment of a method for processing model data according to the present disclosure is illustrated, and the method for processing model data includes the following steps:

Step 201, acquiring data of at least two different modalities in a to-be-processed dataset.

In the present embodiment, the to-be-processed dataset includes data of multiple different modalities, and the data of multiple different modalities may be single-modal data from multiple different sources or single-modal data in different forms of representations. In practice, the single-modal data from multiple different sources refers to description data of the same object collected by different sensors. For example, audio data and image data of the same animal at the same moment collected during video retrieval, where the audio data and the image data are two different types of single-modal data. The single-modal data in different forms of representations refers to that the representation contents of the data may be known through the data, e.g., in task-based dialogue communication processes, the image data and text data sent by a user to a dialogue robot.

In the present embodiment, the to-be-processed dataset may include a dataset preset for the purpose of implementing construction or training an autoregressive model; and the to-be-processed dataset may also include a set of all single-modal data that the autoregressive model needs to process after the autoregressive model is trained.

The autoregressive model is a statistical method that processes time series by using performance of a same variable in previous periods to predict the performance of the variable in a current period, and assuming that the performances are linearly related. For example, an autoregressive language model predicts a next word that is likely to follow based on a part of a text before the word, or conversely, predicts a previous word based on a part of the text after the word.

In practical application scenarios, such as a task-based dialogue communication process, it is often necessary to supplement some knowledge base in order to provide effective answers to questions. For example, in a shopping mall online customer service system, customers often need to ask about some attributes of goods. Dialogue generation driven by knowledge graph information is more accurate in content, and the volume of information contained is more adequate to meet the needs of customers in practical application scenarios. For the above scenario, the data of at least two different modalities may include any two or more of: to-be-processed text data, image data, and/or knowledge graph data.

In the present embodiment, an executing body of the method for processing model data (e.g., the server 105 as shown in FIG. 1) may acquire the to-be-processed dataset by various means, such as, collecting the to-be-processed dataset from a user terminal (e.g., the terminal devices 101, 102, 103 as shown in FIG. 1) in real time, and extracting the data of at least two different modalities from the to-be-processed dataset, or acquiring the to-be-processed dataset from a local memory, and extracting the data of at least two different modalities from the to-be-processed dataset.

Step 202, performing feature extraction on the data of at least two different modalities to obtain extracted features, and then splicing and/or superimposing the extracted features, to obtain a feature sequence.

In the present embodiment, since the obtained data of at least two different modalities have their own standards, for single-modal data that may have a unified form after data transformation, extracted features may be spliced after the feature extraction to obtain a spliced sequence. For example, for knowledge graph data in a knowledge base, the knowledge graph data exists in the form of a triad of head entity, relationship entity, and tail entity. During data processing, text contents corresponding to the head entity, the relationship entity, and the tail entity in the triad involved in a dialogue may be extracted to obtain ternary text data, which has a unified form with the text data. Thus, the extracted to-be-processed text data may be spliced with the ternary text data.

Correspondingly, for single-modal data that does not have a unified data form after data transformation, extracted features may be superimposed after the feature extraction, and the superimposition in the present embodiment is only a method for superimposing pieces of information, the pieces of information still exist independently in different feature vector spaces. For example, the image data and the to-be-processed text data cannot be transformed to a unified data form, but both represent the same object, and the form of image data can describe the same object more vividly and richly, compared with the form of text data.

In some alternative implementations of the present embodiment, the data of at least two different modalities includes: to-be-processed text data, and knowledge graph data; the performing feature extraction on the data of at least two different modalities to obtain extracted features, and then splicing and/or superimposing the extracted features, to obtain a feature sequence, includes: collecting ternary text data corresponding to the knowledge graph data; and performing, respectively, word segmentation on the ternary text data and the to-be-processed text data to obtain word segmentation results, and splicing the all word segmentation results to obtain the feature sequence.

Figure 4:
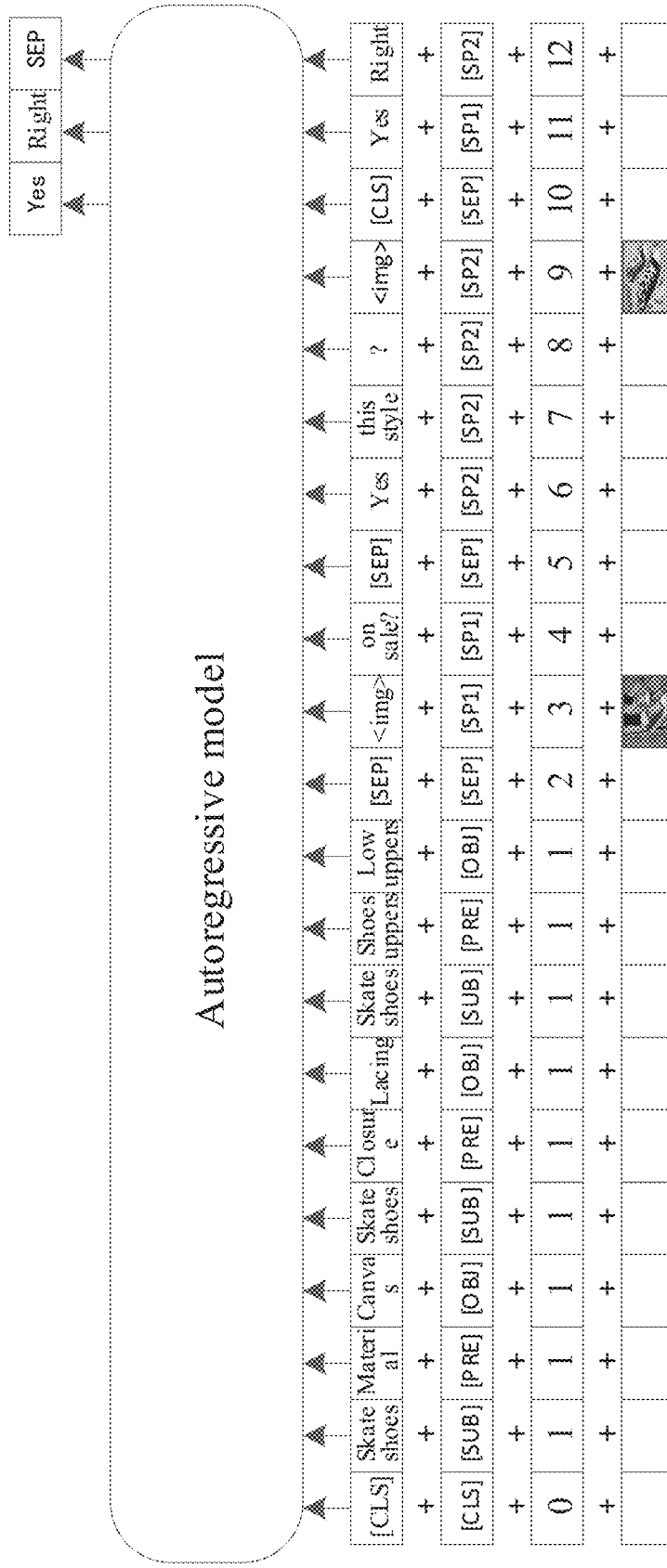
FIG. 4 is a diagram of a data structure in a practical scenario of the present disclosure.

In particular, the process of performing word segmentation on the ternary text data and the to-be-processed text data is described in detail in the embodiment as shown in FIG. 4.

In this alternative implementation, when the data of at least two different modalities includes the to-be-processed text data and the knowledge graph data, the features extracted from the to-be-processed text data and the knowledge graph data are spliced, which may effectively enrich data information.

Alternatively, for the above alternative implementation, the data of at least two different modalities may further include: image data. The performing feature extraction on the data of at least two different modalities to obtain extracted features, and then splicing and/or superimposing the extracted features, to obtain a feature sequence, includes: performing feature extraction on the image data to obtain image features; and superimposing the image features and the obtained feature sequence.

In this alternative implementation, the feature sequence may be obtained by superimposing the image features after all the word segmentation results are spliced, thus enriching the data information in a form other than knowledge graph and text.

In some alternative implementations of the present embodiment, the data of at least two different modalities includes: to-be-processed text data, and image data; the performing feature extraction on the data of at least two different modalities to obtain extracted features, and then splicing and/or superimposing the extracted features, to obtain a feature sequence, includes:

performing word segmentation on the to-be-processed text data to obtain word segmentation results, and splicing all the word segmentation results to obtain a word segmentation sequence; performing feature extraction on the image data to obtain image features; and superimposing the word segmentation sequence and the image features to obtain the feature sequence.

In the present embodiment, since the word segmentation sequence and the image features are different data in two different dimensional spaces, the above superimposition of the word segmentation sequence and the image features is only one way of superimposing the two, by which the word segmentation sequence and the image features may be separated quickly after the feature sequence is obtained.

In this alternative implementation, when the data of at least two different modalities includes the to-be-processed text data and the image data, the features extracted from the to-be-processed text data and the image data are superimposed, which may effectively enrich the data information.

Step 203, performing model mapping on the feature sequence, to obtain multi-modal input data adapted to an autoregressive model.

In the present embodiment, performing model mapping on the feature sequence is to transform the feature sequence into data acceptable to the autoregressive model, i.e., a dimension of the transformed data is the same as a dimension of an input layer of the autoregressive model, so that the transformed data may be input into the autoregressive model, and the transformed data may also be adjusted with the change of parameters during the training of the autoregressive model.

In the present embodiment, on the basis that contents of the data of at least two different modalities are different, the contents of obtained feature sequences are different, and therefore, contents of the multi-modal input data are also different.

In some alternative implementations of the present embodiment, when the data of at least two different modalities includes: to-be-processed text data, and image data; the performing model mapping on the feature sequence, to obtain multi-modal input data adapted to an autoregressive model, includes:

mapping the word segmentation sequence to a vector in the feature sequence adapted to the autoregressive model on, to obtain a data feature vector of the word segmentation sequence; mapping the image features in the feature sequence to a vector of a same dimension as an input layer of the autoregressive model, to obtain an image feature vector; and adding the data feature vector and the image feature vector to obtain the multi-modal input data adapted to the autoregressive model.

In the present embodiment, mapping different data to vectors adapted to the autoregressive model refers to transforming the different data into vectors of the same dimension as the input layer of the autoregressive model, so that the input layer of the autoregressive model may receive the transformed different vectors. Of course, the means used to transform different forms of data into vectors of the same dimension as the input layer of the autoregressive model may be different.

In this alternative implementation, when the data of at least two different modalities includes the to-be-processed text data and the image data, vector mapping may be performed on the to-be-processed text data and the image data respectively, which enriches the diversity of the contents of the multi-modal input data.

Alternatively, when the data of at least two different modalities includes: to-be-processed text data, and knowledge graph data, the performing model mapping on the feature sequence, to obtain multi-modal input data adapted to an autoregressive model, includes:

mapping the feature sequence to a vector adapted to the autoregressive model, to obtain a data feature vector corresponding to the feature sequence. The data feature vector is the obtained multi-modal input data adapted to the autoregressive model. It should be noted that in this alternative implementation, the feature sequence is also the spliced word segmentation results.

In some alternative implementations of the present embodiment, when the data of at least two different modalities includes: to-be-processed text data, knowledge graph data and image data, the performing model mapping on the feature sequence, to obtain multi-modal input data adapted to an autoregressive model, includes:

mapping the spliced word segmentation results in the feature sequence to a vector adapted to the autoregressive model, to obtain a data feature vector corresponding to the spliced word segmentation results; mapping the image features in the feature sequence to a vector of a same dimension as an input layer of the autoregressive model, to obtain an image feature vector; and adding the data feature vector and the image feature vector to obtain the multi-modal input data adapted to the autoregressive model.

In this alternative implementation, when the data of at least two different modalities includes: the to-be-processed text data, the knowledge graph data, and the image data, word segmentation is performed on the to-be-processed text data and the knowledge graph data to obtain a plurality of word segmentation results, all the word segmentation results are spliced to obtain the spliced word segmentation results, and vector mapping is performed on the spliced word segmentation results and the image features respectively, so that the contents of the multi-modal input data are enriched with the data of different modalities.

Further, since each feature in the feature sequence has a position feature and a type feature, the above obtained feature sequence may be marked by position and type.

In some alternative implementations of the present embodiment, when the data of at least two different modalities includes: to-be-processed text data, and knowledge graph data, the method further includes: determining total position data of the word segmentation results in the spliced word segmentation results in the feature sequence.

The performing model mapping on the feature sequence, to obtain multi-modal input data adapted to an autoregressive model, includes: mapping the feature sequence to a vector adapted to the autoregressive model, to obtain a data feature vector corresponding to the feature sequence; mapping the total position data to a vector adapted to the autoregressive model, to obtain a total position vector; and adding the data feature vector and the total position vector to obtain the multi-modal input data adapted to the autoregressive model.

In this alternative implementation, based on a position order of the word segmentation results in the spliced word segmentation results, position data (e.g., codes) may be assigned to the word segmentation results, and the total position data is a set including the position data of respective word segmentation results in all the word segmentation results. The position data allows easy and fast determination of order values of the respective word segmentation results or information represented by the respective word segmentation results in the spliced word segmentation results.

In this alternative implementation, by determining the total position data of the word segmentation results, the word segmentation results in the feature sequence may be effectively located, enriching a position feature of the multi-modal input data.

In some alternative implementations of the present embodiment, when the data of at least two different modalities includes: to-be-processed text data, and knowledge graph data, the method further includes: classifying the respective word segmentation results in the spliced word segmentation results in the feature sequence to obtain total classification data. The performing model mapping on the feature sequence, to obtain multi-modal input data adapted to an autoregressive model, includes: mapping the feature sequence to a vector adapted to the autoregressive model, to obtain a data feature vector corresponding to the feature sequence; mapping the total classification data to a vector adapted to the autoregressive model, to obtain a total classification vector; and adding the data feature vector and the total classification vector to obtain the multi-modal input data adapted to the autoregressive model.

In this alternative implementation, based on types of the word segmentation results in the spliced word segmentation results, classification data (e.g., codes) may be assigned to the word segmentation results, and the total classification data is a set including the classification data of respective word segmentation results in all the word segmentation results. The classification data allows easy and fast determination of the types of the respective word segmentation results in the spliced word segmentation results.

In this alternative implementation, by determining the total classification data of the word segmentation results, the types of the word segmentation results in the feature sequence may be effectively determined, enriching a classification feature of the multi-modal input data.

Alternatively, when the data of at least two different modalities includes: to-be-processed text data, and knowledge graph data, the method further includes: determining total position data of the respective word segmentation results in the spliced word segmentation results in the feature sequence; and classifying the word segmentation results in the spliced word segmentation results in the feature sequence to obtain total classification data. The performing model mapping on the feature sequence, to obtain multi-modal input data adapted to an autoregressive model, includes: mapping the feature sequence to a vector adapted to the autoregressive model, to obtain a data feature vector corresponding to the feature sequence; mapping the total position data to a vector adapted to the autoregressive model, to obtain a total position vector; mapping the total classification data to a vector adapted to the autoregressive model, to obtain a total classification vector; and adding the data feature vector, the total position vector, and the total classification vector to obtain the multi-modal input data adapted to the autoregressive model.

In some alternative implementations of the present embodiment, when the data of at least two different modalities includes: to-be-processed text data, and knowledge graph data, the method further includes: determining word position data of words in the word segmentation sequence; and classifying the words in the word segmentation sequence, to obtain word classification data; the performing model mapping on the feature sequence, to obtain multi-modal input data adapted to an autoregressive model, further includes:

mapping the word segmentation sequence in the feature sequence to a vector adapted to the autoregressive model on, to obtain a data feature vector of the word segmentation sequence; mapping the image features in the feature sequence to a vector of a same dimension as an input layer of the autoregressive model, to obtain an image feature vector; mapping the word position data to a vector adapted to the autoregressive model, to obtain a word position vector; mapping the word classification data to a vector adapted to the autoregressive model, to obtain a word classification vector; and adding the data feature vector, the word position vector, the word classification vector, and the image feature vector to obtain the multi-modal input data adapted to the autoregressive model.

In this alternative implementation, by determining the word position data and the classification data of the words in the word segmentation sequence, types of the words and positions of the words in the word segmentation sequence may be effectively determined, enriching the position feature and a type feature of the multi-modal input data.

Step 204, inputting the multi-modal input data into the autoregressive model, to obtain a single-modal result output by the autoregressive model.

In the present embodiment, the autoregressive model may be an autoregressive model of which output data is single-modal data, e.g., UniLM (Unified Language Model Pre-training for Natural Language Understanding and Generation), GPT (Generative Pre-training), and other models. The autoregressive model may be a newly constructed model (e.g., multi-modal data at an input end and single-modal data at an output end).

Alternatively, the autoregressive model may also be a pre-trained autoregressive model, both the input and the output of this autoregressive model are single-modal data, e.g., the autoregressive model is a language model, and its input and output are text data.

For the language model, an applicable to-be-processed dataset may be data such as dialogue records, or chapters or paragraphs of an article.

After inputting the multi-modal input data into the autoregressive model, a trained autoregressive model may be obtained by performing model training on the autoregressive model.

For a question-and-answer type of autoregressive model, a user' question (having multi-modal data such as pictures and knowledge base) may be input into the trained autoregressive model to obtain an answer to the user' question.

In a practical application scenario, the autoregressive model may adopt Transformer (autoregressive model structure), for example the autoregressive model may be a UniLM or DialoGPT model. The method of the present disclosure enables the autoregressive model to process multi-modal data containing information such as pictures, knowledge graphs, and text in addition to traditional text data, so that the whole autoregressive model can have a good processing effect on to-be-processed datasets having multi-modality.

The method for processing model data provided by embodiments of the present disclosure, first acquires data of at least two different modalities in a to-be-processed dataset; secondly performs feature extraction on the data of at least two different modalities to obtain extracted features, and then splices and/or superimposes the extracted features, to obtain a feature sequence; next performs model mapping on the feature sequence, to obtain multi-modal input data adapted to an autoregressive model; and finally inputs the multi-modal input data into the autoregressive model, to obtain a single-modal result output by the autoregressive model. Thus, by inputting the multi-modal input data, obtained by processing the data of at least two modalities from the to-be-processed dataset, into the autoregressive model, the autoregressive model can perform multi-modal data processing in addition to performing single-modal data processing, and single-modal results output by the whole model are more accurate, improving a data processing capability of the model.

Figure 3:
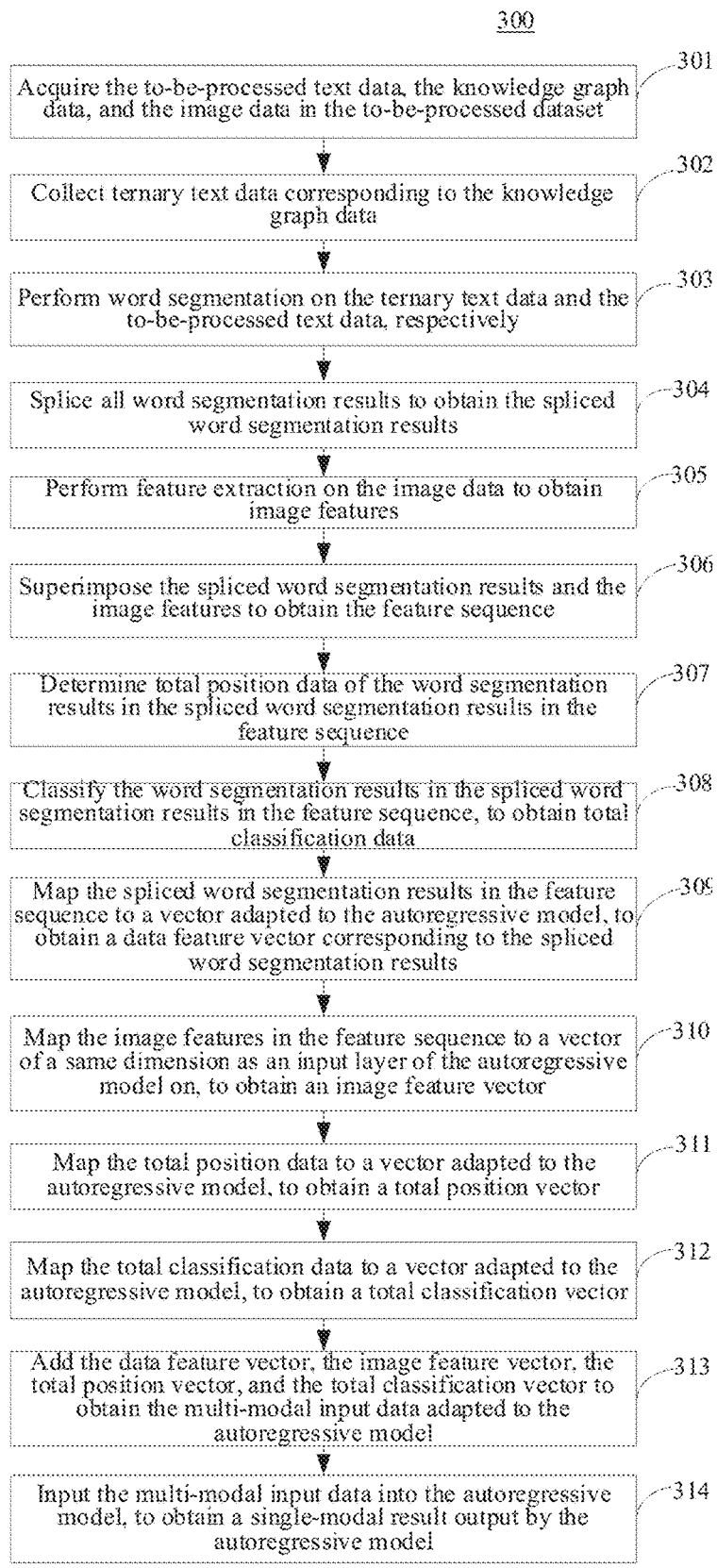
FIG. 3 is a flowchart of another embodiment of the method for processing model data according to the present disclosure.

In another embodiment of the present disclosure, the data of at least two different modalities includes: to-be-processed text data, knowledge graph data and image data, as shown in FIG. 3, a flow 300 of another embodiment of the method for processing model data according to the present disclosure is illustrated, and the method for processing model data includes the following steps:

Step 301, acquiring the to-be-processed text data, the knowledge graph data, and the image data in the to-be-processed dataset.

As shown in FIG. 4, the to-be-processed dataset may be dialogue data obtained by intercepting and processing from a dialogue system (e.g., a customer service system of a shopping mall), which includes text data, image data, and knowledge graph data in dialogue content can be obtained from a pre-built knowledge graph. It should be noted that text corresponding to the to-be-processed text data is composed of at least one sentence, and each sentence may be separated by symbols.

In FIG. 4, the to-be-processed text corresponding to the to-be-processed text data includes a question sentence and an answer sentence, the question sentence is: skate shoes on sale? Here, the skate shoes in the question sentence are displayed in a picture sent by the user. The answer sentence is: is this style of skate shoes you want? Here, the skate shoes in the answer sentence are displayed in another picture sent by the executing body.

Step 302, collecting ternary text data corresponding to the knowledge graph data.

In the present embodiment, the knowledge graph data are stored in the form of a triad of head entity, relationship entity, and tail entity. After the knowledge graph data is extracted, it is easy to obtain the head entity, the relationship entity and the tail entity in the knowledge graph data.

In FIG. 4, by retrieving the knowledge graph, the knowledge graph data may be obtained, including: skate shoes-material-canvas; skate shoes-closure-lacing; and skate shoes-shoes uppers-low tops. Ternary text corresponding to the ternary text data are: skate shoes, material, canvas; skate shoes, closure, lacing; and skate shoes, shoes uppers, low tops.

Step 303, performing word segmentation on the ternary text data and the to-be-processed text data, respectively.

In the present embodiment, traditional word segmentation tools may be used to perform word segmentation on the to-be-processed text corresponding to the to-be-processed text data and the ternary text corresponding to the ternary text data, respectively.

In particular, word segmentation may be performed on the ternary text to obtain the following word-segmented knowledge expressions, such as S11, S12, . . . , S1$n$, P11, P12, . . . , P1$n$, O11, O12, . . . , O1$n$, 521, S22, . . . S2$n$, P21, P22, . . . , P2$n$, O21, O22, . . . , O2$n$, . . . , Sn1, Sn2, . . . , Snm, Pn1, Pn2, . . . , Pnm, On1, On2, . . . , Onm, where Snm indicates the $m^{th}$ token generated by word segmentation on the head entity in the $n^{th}$ (n>0, m>0) triad, Pnm indicates the $m^{th}$ token generated by word segmentation on the relationship entity in the $n^{th}$ triad, and Onm indicates the $m^{th}$ token generated by word segmentation on the tail entity in the $n^{th}$ triad.

In particular, in the present embodiment, word segmentation may be performed on each sentence in contextual text corresponding to the to-be-processed text data to obtain Wn1, Wn2, Wn3, . . . , Wnm, where Wnm indicates the $m^{th}$ token after the word segmentation on the $n^{th}$ (n>0, m>0) sentence. In actual word segmentation, special meaningful text symbols, such as URL (Uniform Resource Location) links, and special meaningful texts such as emoji text expressions, may be replaced by special tokens, so that semantics of the sentence may be maintained to a maximum extent.

Step 304, splicing all word segmentation results to obtain the spliced word segmentation results.

Referring to FIG. 4, with a special symbol [CLS] as the sentence prefix, tokens of the above knowledge graph data (referred to as knowledge tokens) and the word segmentation tokens of the sentences in the to-be-processed text may be spliced sequentially. Here, a special symbol [SEP] needs to be added between the knowledge graph data and the to-be-processed text and between sentences, to indicate an interval between tokens of different contents.

Step 305, performing feature extraction on the image data to obtain image features.

In the present embodiment, for pictures appearing in the to-be-processed dataset, a pre-trained feature collection model (e.g., ResNet50) may be used to perform feature extraction on the pictures.

Step 306, superimposing the spliced word segmentation results and the image features to obtain the feature sequence.

In the present embodiment, superimposing the spliced word segmentation results and the image features is to facilitate obtaining a feature sequence as a unified whole for subsequent processing of the whole feature sequence.

Step 307, determining total position data of the word segmentation results in the spliced word segmentation results in the feature sequence.

In the present embodiment, determining the total position data is to assign position codes to the word segmentation results in the feature sequence, as shown in FIG. 4, the position data of [CLS] located at the beginning of the sentence is 0, the position data of all the knowledge tokens is 1, and remaining non-knowledge tokens are incremented in order from 2 according to the orders thereof. As shown in FIG. 4, the total position data obtained are: 0 1 1 1 1 1 1 1 1 1 1 1 2 3 4 5 6 7 8 9 10 11 12.

Step 308, classifying the word segmentation results in the spliced word segmentation results in the feature sequence to obtain total classification data.

In the present embodiment, in order to distinguish different groupings in spliced tokens, referring to FIG. 4, several categories are specifically introduced to indicate different token categories, a [CLS] category indicates that the token is a beginning token of the sentence, a [SEP] category indicates that the token is used to separate knowledge and a sentence, or separate sentences, a [SUB] category indicates that the token belongs to a head entity in a knowledge triad, a [PRE] category indicates that the token belongs to a relationship entity in a knowledge triad, and an [OBJ] category indicates that the token belongs to a tail entity in a knowledge triad. A [SP1] category indicates that the token belongs to content narrated by character 1 in a dialogue, and a [SP2] category indicates that the token belongs to content narrated by character 2 in the dialogue.

Step 309, mapping the spliced word segmentation results in the feature sequence to a vector adapted to the autoregressive model, to obtain a data feature vector corresponding to the spliced word segmentation results.

Vector mapping in the present embodiment refers to mapping and fusing feature data to a feature vector adapted to the autoregressive model.

In the present embodiment, since the knowledge tokens (Snm, Pnm, Onm) generated in step 303, the text token Wnm, and [CLS] and [SEP] generated in step 304, are semantically consistent, a same word list and corresponding vector mapping may be used for all three to obtain the data feature vector, and a dimension of the obtained data feature vector is the same as a dimension of an input layer of the autoregressive model.

In practice, the data feature vector may be obtained by a tf.nn.embedding_lookup (params, ids) function, which mainly selects an element corresponding to an index inside a tensor, where params may be the tensor or an array, etc., and ids is the corresponding index value, which is also the vector corresponding to the autoregressive model.

Step 310, mapping the image features in the feature sequence to a vector of a same dimension as an input layer of the autoregressive model on, to obtain an image feature vector.

In the present embodiment, for the image features in the feature sequence, the image features may be processed by using a linear regression model (Linear) to map the image features to a specified dimension which is the same dimension as the input layer of the autoregressive model.

It should be noted that the autoregressive model may be a language model (e.g., a question-and-answer model) and the dimension of the input layer of the autoregressive model is determined by a dimension of an embedding (embedding layer) in the autoregressive model. The dimension of the embedding is a hyperparameter, for example, may be 300 dimensions or 512 dimensions.

Step 311, mapping the total position data to a vector adapted to the autoregressive model, to obtain a total position vector.

In the present embodiment, the total position vector may be obtained by using a traditional Transformer trigonometric position encoding method, so as to map the corresponding total position data to a continuous space of the specified dimension.

Step 312, mapping the total classification data to a vector adapted to the autoregressive model, to obtain a total classification vector.

In the present embodiment, the seven different category tokens obtained in step 308 are mapped to a continuous space of the specified dimension using one word list and the corresponding vector mapping.

Step 313, adding the data feature vector, the image feature vector, the total position vector, and the total classification vector to obtain the multi-modal input data adapted to the autoregressive model.

In the present embodiment, through the above processing, it can be seen that since the data feature vector, the image feature vector, the total position vector, and the total classification vector are all mapped to the specified dimension, these four vectors may be added to obtain the input data of the autoregressive model.

Step 314, inputting the multi-modal input data into the autoregressive model, to obtain a single-modal result output by the autoregressive model.

In the present embodiment, the autoregressive model may be an autoregressive language model based on Transformer (a model structure consisting of an encoder and a decoder). As shown in FIG. 4, the multi-modal input data is obtained by data processing of the dialogue contextual text, the picture, and the knowledge information, the multi-modal input data is input into the autoregressive language model, and the model is trained. When answers to user questions are generated, the multi-modal information and the knowledge information may be utilized, thus generating more fluent and more accurate answers.

In the present embodiment, through effective fusion of information from the knowledge graph data, the image data and the text data, dialogue contextual information is fully expressed, and training is performed end-to-end through the autoregressive structure-based model, thus generating fluent, information-rich dialogue answers.

According to the method for processing model data provided by the present embodiment, when the data of at least two different modalities includes: the to-be-processed text data, the knowledge graph data and the image data, the image features extracted from the image data are superimposed with the spliced word segmentation results formed by the to-be-processed text data and the knowledge graph data to obtain the feature sequence. Total position data of the word segmentation results in the spliced word segmentation results in the feature sequence is determined, the word segmentation results in the spliced word segmentation results in the feature sequence are classified to obtain total classification data; vector mapping adapted to the autoregressive model is performed on the total position data, the total classification data, and the spliced word segmentation results, to obtain the data feature vector, the image feature vector, the total position vector, and the total classification vector, respectively; vector mapping of the same dimension as the input layer of the autoregressive model is performed on the image data, to obtain the image feature vector, and the data feature vector, the image feature vector, the total position vector, and the total classification vector are added to obtain the multi-modal input data adapted to the autoregressive model. Thus, the data of different modalities such as knowledge base, text and image may be covered, and the data of different modalities may be effectively located and classified, which improves an accuracy of the obtained multi-modal input data, and makes single-modal results output by the autoregressive model more fluent and accurate.

Figure 5:
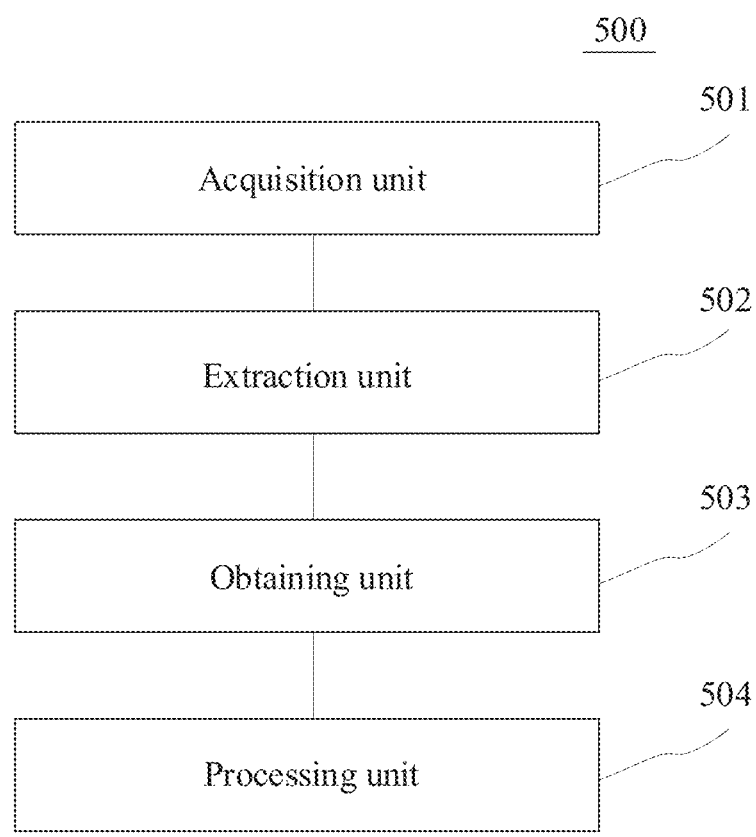
FIG. 5 is a schematic structural diagram of an embodiment of an apparatus for processing model data according to the present disclosure.

With further reference to FIG. 5, as an implementation of the method shown in the above figures, the present disclosure provides an embodiment of an apparatus for processing model data, and the apparatus embodiment corresponds to the method embodiment shown in FIG. 2. The apparatus may be applied to various electronic devices.

As shown in FIG. 5, an embodiment of the present disclosure provides an apparatus 500 for processing model data, the apparatus 500 including: an acquisition unit 501, an extraction unit 502, an obtaining unit 503, and a processing unit 504. The acquisition unit 501 may be configured to acquire data of at least two different modalities in a to-be-processed dataset. The extraction unit 502 may be configured to perform feature extraction on the data of at least two different modalities to obtain extracted features, and then splice and/or superimpose the extracted features, to obtain a feature sequence. The obtaining unit 503 may be configured to perform model mapping on the feature sequence, to obtain multi-modal input data adapted to an autoregressive model. The processing unit 504 may be configured to input the multi-modal input data into the autoregressive model, to obtain a single-modal result output by the autoregressive model.

In the present embodiment, in the apparatus 500 for processing model data, for the specific processing and the technical effects of the acquisition unit 501, the extraction unit 502, the obtaining unit 503, and the processing unit 504, reference may be made to step 201, step 202, step 203, step 204 in the corresponding embodiment of FIG. 2 respectively.

In some embodiments, the data of at least two different modalities includes: to-be-processed text data and knowledge graph data; and the extraction unit 502 includes: a collection module (not shown in the figure), a total word segmentation module (not shown in the figure), and a total splicing module (not shown in the figure). The collection module may be configured to collect ternary text data corresponding to the knowledge graph data. The total word segmentation module may be configured to perform, respectively, word segmentation on the ternary text data and the to-be-processed text data to obtain word segmentation results. The total splicing module may be configured to splice all the word segmentation results to obtain the feature sequence.

In some embodiments, the apparatus 500 further includes: a total locating unit (not shown in the figure), and the total locating unit may be configured to determine total position data of the word segmentation results in the spliced word segmentation results in the feature sequence. The obtaining unit 503 includes: a data mapping module (not shown in the figure), a total position mapping module (not shown in the figure), and a data position obtaining module (not shown in the figure). The data mapping module may be configured to map the feature sequence to a vector adapted to the autoregressive model, to obtain a data feature vector corresponding to the feature sequence. The total position mapping module may be configured to map the total position data to a vector adapted to the autoregressive model, to obtain a total position vector. The data position obtaining module may be configured to add the data feature vector and the total position vector to obtain the multi-modal input data adapted to the autoregressive model.

In some embodiments, the apparatus 500 further includes: a total classification unit (not shown in the figure), and the total classification unit may be configured to classify the word segmentation results in the spliced word segmentation results in the feature sequence to obtain total classification data. The obtaining unit 503 includes: a data mapping module (not shown in the figure), a total classification mapping module (not shown in the figure), and a data classification obtaining module (not shown in the figure). The data mapping module may be configured to map the feature sequence to a vector adapted to the autoregressive model, to obtain a data feature vector corresponding to the feature sequence. The total classification mapping module may be configured to map the total classification data to a vector adapted to the autoregressive model, to obtain a total classification vector. The data classification obtaining module may be configured to add the data feature vector and the total classification vector to obtain the multi-modal input data adapted to the autoregressive model.

In some embodiments, the data of at least two different modalities further includes: image data. The extraction unit 502 is further configured to: perform feature extraction on the image data to obtain image features. In the embodiments, the image features are superimposed further with the obtained feature sequence. The obtaining unit 503 includes: a data mapping module (not shown in the figure), an image mapping module (not shown in the figure), and a data image obtaining module (not shown in the figure). The data mapping module may be configured to map the spliced word segmentation results in the feature sequence to a vector adapted to the autoregressive model, to obtain a data feature vector corresponding to the spliced word segmentation results. The image mapping module may be configured to map the image features in the feature sequence to a vector of a same dimension as an input layer of the autoregressive model, to obtain an image feature vector. The data image obtaining module may be configured to add the data feature vector and the image feature vector to obtain the multi-modal input data adapted to the autoregressive model.

In some embodiments, the apparatus 500 further includes: a total locating unit (not shown in the figure), and a total classification unit (not shown in the figure). The total locating unit may be configured to determine total position data of the word segmentation results in the spliced word segmentation results in the feature sequence. The total classification unit may be configured to classify the word segmentation results in the spliced word segmentation results in the feature sequence to obtain total classification data. The obtaining unit 503 further includes: a total position mapping module (not shown in the figure), and a total classification mapping module (not shown in the figure). The total position mapping module is configured to map the total position data to a vector adapted to the autoregressive model, to obtain a total position vector. The total classification mapping module is configured to map the total classification data to a vector adapted to the autoregressive model, to obtain a total classification vector. In the present embodiment, the obtained multi-modal input data adapted to the autoregressive model further includes the total position vector and the total classification vector.

In some embodiments, the data of at least two different modalities includes: to-be-processed text data and image data. The extraction unit 502 includes: a word-segmentation module (not shown in the figure), a splicing module (not shown in the figure), an extraction module (not shown in the figure), and a superimposing module (not shown in the figure). The word-segmentation module may be configured to perform word segmentation on the to-be-processed text data to obtain word segmentation results. The splicing module may be configured to splice all word segmentation results to obtain a word segmentation sequence. The extraction module may be configured to perform feature extraction on the image data to obtain image features. The superimposing module may be configured to superimpose the word segmentation sequence and the image features to obtain the feature sequence. The obtaining unit 503 includes: a word segmentation mapping module (not shown in the figure), an image mapping module (not shown in the figure), and a word image obtaining module (not shown in the figure). The word segmentation mapping module may be configured to map the word segmentation sequence in the feature sequence to a vector adapted to the autoregressive model, to obtain a data feature vector of the word segmentation sequence. The image mapping module may be configured to map the image features in the feature sequence to a vector of a same dimension as an input layer of the autoregressive model, to obtain an image feature vector. The word image obtaining module may be configured to add the data feature vector and the image feature vector to obtain the multi-modal input data adapted to the autoregressive model.

In some embodiments, the apparatus 500 further includes: a word locating unit (not shown in the figure), and a word classification unit (not shown in the figure). The word locating unit is configured to determine word position data of words in the word segmentation sequence. The word classification unit is configured to classify the words in the word segmentation sequence, to obtain word classification data. The obtaining unit 503 further includes: a word position mapping module (not shown in the figure), and a word classification module (not shown in the figure). The word position mapping module may be configured to map the word position data to a vector adapted to the autoregressive model, to obtain a word position vector. The word classification module may be configured to map the word classification data to a vector adapted to the autoregressive model, to obtain a word classification vector. In the present embodiment, the obtained multi-modal input data adapted to the autoregressive model further includes the word position vector and the word classification vector.

Figure 6:
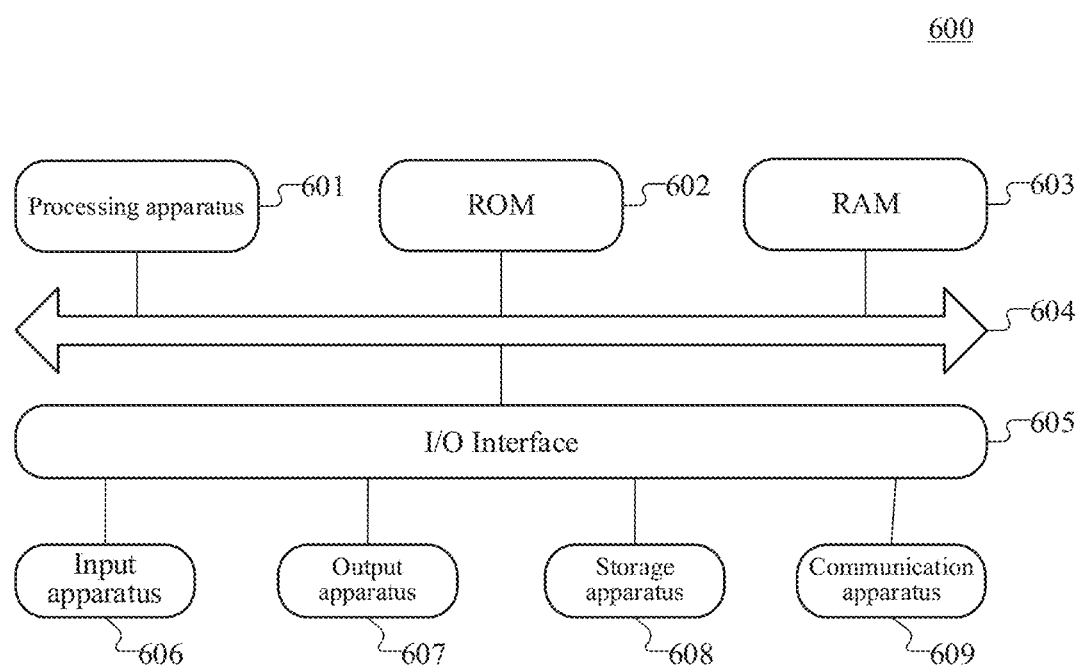
FIG. 6 is a schematic structural diagram of an electronic device suitable for implementing embodiments of the present disclosure.

Referring next to FIG. 6, a schematic structural diagram of an electronic device 600 suitable for implementing embodiments of the present disclosure is illustrated.

As shown in FIG. 6, the electronic device 600 may include a processing apparatus 601 (e.g., a central processing unit or a graphics processing unit), which may execute various appropriate actions and processes in accordance with a program stored in a read only memory (ROM) 602 or a program loaded into a random-access memory (RAM) 603 from a storage apparatus 608. The RAM 603 further stores various programs and data required by operations of the electronic device 600. The CPU 601, the ROM 602, and the RAM 603 are connected to each other through a bus 604. An input/output (I/O) interface 605 is also connected to the bus 604.

In general, the following apparatuses may be connected to the I/O interface 605: an input apparatus 606 including a touch screen, a touch pad, a keyboard, a mouse, or the like; an output apparatus 607 including a liquid crystal display device (LCD), a speaker, a vibrator, or the like; a storage apparatus 608 including a magnetic tape, a hard disk, or the like; and a communication apparatus 609. The communication apparatus 609 may allow the electronic device 600 to exchange data with other devices through wireless or wired communication. While FIG. 6 shows the electronic device 600 having various apparatuses, it should be understood that it is not necessary to implement or provide all of the apparatuses shown in the figure. More or fewer apparatuses may be alternatively implemented or provided. Each block shown in FIG. 6 may represent an apparatus, or represent a plurality of apparatuses as required.

In particular, according to the embodiments of the present disclosure, the process described above with reference to the flow chart may be implemented as a computer software program. For example, embodiments of the present disclosure include a computer program product, which includes a computer program that is tangibly embedded in a computer readable medium. The computer program includes a program code for executing the method as shown in the flow chart. In such an embodiment, the computer program may be downloaded and installed from a network via the communication apparatus 609, or be installed from the storage apparatus 608, or be installed from the ROM 602. The computer program, when executed by the processing apparatus 601, implements the above functions as defined by the method of the embodiments of the present disclosure.

It should be noted that the computer readable medium of the embodiments of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random-access memory (RAM), a read only memory (ROM), an erasable programmable read-only memory (EPROM or flash memory), an optical fiber, a portable compact disk read-only memory (CD-ROM), an optical memory, a magnetic memory, or any suitable combination of the above. In the embodiments of the present disclosure, the computer readable storage medium may be any tangible medium containing or storing programs which may be used by, or used in combination with, a command execution system, apparatus or element. In the embodiments of the present disclosure, the computer readable signal medium may include a data signal in the base band or propagating as a part of a carrier wave, in which a computer readable program code is carried. The propagating data signal may take various forms, including but not limited to an electromagnetic signal, an optical signal, or any suitable combination of the above. The computer readable signal medium may also be any computer readable medium except for the computer readable storage medium. The computer readable signal medium is capable of transmitting, propagating or transferring programs for use by, or use in combination with, a command execution system, apparatus or element. The program code contained on the computer readable medium may be transmitted with any suitable medium, including but not limited to: wire, an optical cable, a RF (radio frequency) medium etc., or any suitable combination of the above.

The computer readable medium may be included in the above server, or a stand-alone computer readable medium not assembled into the server. The computer readable medium carries one or more programs. The one or more programs, when executed by the server, cause the server to: acquire data of at least two different modalities in a to-be-processed dataset; perform feature extraction on the data of at least two different modalities, and then splice and/or superimpose extracted features, to obtain a feature sequence; perform model mapping on the feature sequence, to obtain multi-modal input data adapted to an autoregressive model; and input the multi-modal input data into the autoregressive model, to obtain a single-modal result output by the autoregressive model.

A computer program code for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the case where a remote computer is involved, the remote computer may be connected to a user computer through any kind of networks, including a local area network (LAN) or a wide area network (WAN), or may be connected to an external computer (for example, connected through the Internet using an Internet service provider).

The flow charts and block diagrams in the figures illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, functions annotated in the blocks may also occur in an order different from the order annotated in the figures. For example, any two blocks presented in succession may be executed substantially in parallel, or sometimes be executed in a reverse sequence, depending on the functions involved. It should also be noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, may be described as: a processor including an acquisition unit, an extraction unit, an obtaining unit, and a processing unit. Here, the names of these units do not in some cases constitute limitations to such units themselves. For example, the acquisition unit may also be described as "a unit configured to acquire data of at least two different modalities in a to-be-processed dataset".

The above description only provides explanation of the preferred embodiments and the employed technical principles of the present disclosure. It should be appreciated by those skilled in the art that the inventive scope involved in embodiments of the present disclosure is not limited to the technical solutions formed by the particular combinations of the above technical features. The inventive scope should also cover other technical solutions formed by any combination of the above technical features or equivalent features thereof without departing from the inventive concept of the present disclosure, for example, the technical solutions formed by interchanging the above features with, but not limited to, technical features with similar functions disclosed in the embodiments of the present disclosure.

What is claimed is:

1. A method for processing model data, the method comprising:
    acquiring data of at least two different modalities in a to-be-processed dataset, wherein the data of at least two different modalities comprises: to-be-processed text data, and image data;
    performing feature extraction on the data of at least two different modalities to obtain extracted features, and then splicing or superimposing the extracted features, to obtain a feature sequence, comprising:
    performing word segmentation on the to-be-processed text data to obtain word segmentation results, and splicing all the word segmentation results to obtain a word segmentation sequence,
    performing feature extraction on the image data to obtain image features, and
    superimposing the word segmentation sequence and the image features to obtain the feature sequence;
    performing model mapping on the feature sequence, to obtain multi-modal input data adapted to an autoregressive model, comprising:
    mapping the word segmentation sequence in the feature sequence to a vector adapted to the autoregressive model, to obtain a data feature vector of the word segmentation sequence,
    mapping the image features in the feature sequence to a vector of a same dimension as an input layer of the autoregressive model, to obtain an image feature vector, and
    adding the data feature vector and the image feature vector to obtain the multi-modal unput data adapted to the autoregressive model; and
    inputting the multi-modal input data into the autoregressive model, to obtain a single-modal result output by the autoregressive model.

2. The method according to claim 1, wherein the data of at least two different modalities further comprises: knowledge graph data;
    the performing feature extraction on the data of at least two different modalities to obtain extracted features, and then splicing or superimposing the extracted features, to obtain a feature sequence, comprises:
    collecting ternary text data corresponding to the knowledge graph data; and
    performing, respectively, word segmentation on the ternary text data and the to-be-processed text data to obtain word segmentation results, and splicing all the word segmentation results to obtain the feature sequence.

3. The method according to claim 2, wherein the method further comprises:
- determining total position data of respective word segmentation results in the spliced word segmentation results in the feature sequence; and
- the performing model mapping on the feature sequence, to obtain multi-modal input data adapted to an autoregressive model, comprises:
- mapping the feature sequence to a vector adapted to the autoregressive model, to obtain a data feature vector corresponding to the feature sequence;
- mapping the total position data to a vector adapted to the autoregressive model, to obtain a total position vector; and
- adding the data feature vector and the total position vector to obtain the multi-modal input data adapted to the autoregressive model.

4. The method according to claim 2, wherein the method further comprises:
- classifying respective word segmentation results in the spliced word segmentation results in the feature sequence to obtain total classification data; and
- the performing model mapping on the feature sequence, to obtain multi-modal input data adapted to an autoregressive model, comprises:
- mapping the feature sequence to a vector adapted to the autoregressive model, to obtain a data feature vector corresponding to the feature sequence;
- mapping the total classification data to a vector adapted to the autoregressive model, to obtain a total classification vector; and
- adding the data feature vector and the total classification vector to obtain the multi-modal input data adapted to the autoregressive model.

5. The method according to claim 1, wherein the method further comprises:
- determining word position data of respective words in the word segmentation sequence; and
- classifying the respective words in the word segmentation sequence, to obtain word classification data; and
- the performing model mapping on the feature sequence, to obtain multi-modal input data adapted to an autoregressive model, further comprises:
- mapping the word position data to a vector adapted to the autoregressive model, to obtain a word position vector; and
- mapping the word classification data to a vector adapted to the autoregressive model, to obtain a word classification vector; wherein,
- the multi-modal input data adapted to the autoregressive model further comprises the word position vector and the word classification vector.

6. An apparatus for processing model data, the apparatus comprising:
- one or more processors; and
- a storage apparatus, storing one or more programs thereon, wherein,
- the one or more programs, when executed by the one or more processors, cause the one or more processors to implement operations, the operations comprising:
- acquiring data of at least two different modalities in a to-be-processed dataset, wherein the data of at least two different modalities comprises: to-be-processed text data, and image data;
- performing feature extraction on the data of at least two different modalities to obtain extracted features, and then splicing or superimposing the extracted features, to obtain a feature sequence, comprising:
- performing word segmentation on the to-be-processed text data to obtain word segmentation results, and splicing all the word segmentation results to obtain a word segmentation sequence,
- performing feature extraction on the image data to obtain image features, and
- superimposing the word segmentation sequence and the image features to obtain the feature sequence;
- performing model mapping on the feature sequence, to obtain multi-modal input data adapted to an autoregressive model, comprising:
- mapping the word segmentation sequence in the feature sequence to a vector adapted to the autoregressive model, to obtain a data feature vector of the word segmentation sequence,
- mapping the image features in the feature sequence to a vector of a same dimension as an input layer of the autoregressive model, to obtain an image feature vector, and
- adding the data feature vector and the image feature vector to obtain the multi-modal input data adapted to the autoregressive model; and
- inputting the multi-modal input data into the autoregressive model, to obtain a single-modal result output by the autoregressive model.

7. The apparatus according to claim 6, wherein the data of at least two different modalities further comprises: knowledge graph data;
- the performing feature extraction on the data of at least two different modalities to obtain extracted features, and then splicing or superimposing the extracted features, to obtain a feature sequence, comprises:
- collecting ternary text data corresponding to the knowledge graph data; and
- performing, respectively, word segmentation on the ternary text data and the to-be-processed text data to obtain word segmentation results, and splicing all the word segmentation results to obtain the feature sequence.

8. The apparatus according to claim 7, wherein the operations further comprise:
- determining total position data of respective word segmentation results in the spliced word segmentation results in the feature sequence; and
- the performing model mapping on the feature sequence, to obtain multi-modal input data adapted to an autoregressive model, comprises:
- mapping the feature sequence to a vector adapted to the autoregressive model, to obtain a data feature vector corresponding to the feature sequence;
- mapping the total position data to a vector adapted to the autoregressive model, to obtain a total position vector; and
- adding the data feature vector and the total position vector to obtain the multi-modal input data adapted to the autoregressive model.

9. The apparatus according to claim 7, wherein the operations further comprise:
- classifying respective word segmentation results in the spliced word segmentation results in the feature sequence to obtain total classification data; and
- the performing model mapping on the feature sequence, to obtain multi-modal input data adapted to an autoregressive model, comprises:

mapping the feature sequence to a vector adapted to the autoregressive model, to obtain a data feature vector corresponding to the feature sequence;

mapping the total classification data to a vector adapted to the autoregressive model, to obtain a total classification vector; and adding the data feature vector and the total classification vector to obtain the multi-modal input data adapted to the autoregressive model.

10. The apparatus according to claim 6, wherein the operations further comprise:

determining word position data of respective words in the word segmentation sequence; and classifying the respective words in the word segmentation sequence, to obtain word classification data; and the performing model mapping on the feature sequence, to obtain multi-modal input data adapted to an autoregressive model, further comprises:

mapping the word position data to a vector adapted to the autoregressive model, to obtain a word position vector; and mapping the word classification data to a vector adapted to the autoregressive model, to obtain a word classification vector; wherein, the multi-modal input data adapted to the autoregressive model further comprises the word position vector and the word classification vector.

11. A non-transitory computer readable medium, storing a computer program thereon, wherein the computer program, when executed by a processor, implements operations, the operations comprising:

acquiring data of at least two different modalities in a to-be-processed dataset, wherein the data of at least two different modalities comprises: to-be-processed text data and image data;

performing feature extraction on the data of at least two different modalities to obtain extracted features, and then splicing or superimposing the extracted features, to obtain a feature sequence, comprising:

performing word segmentation on the to-be-processed text data word segmentation results, and splicing all the word segmentation results to obtain a word segmentation sequence, performing feature extraction on the image data to obtain image features, and superimposing the word segmentation sequence and the image features to obtain the feature sequence;

performing model mapping on the feature sequence, to obtain multi-modal input data adapted to an autoregressive model, comprising:

mapping the word segmentation sequence in the feature sequence to a vector adapted to the autoregressive model, to obtain a data feature vector of the word segmentation sequence, mapping the image features in the feature sequence to a vector of a same dimension as an input layer of the autoregressive model, to obtain an image feature vector, and adding the data feature vector and the image feature vector to obtain the multi-modal input data adapted to the autoregressive model; and inputting the multi-modal input data into the autoregressive model, to obtain a single-modal result output by the autoregressive model.

12. The non-transitory computer readable medium according to claim 11, wherein the data of at least two different modalities further comprises knowledge graph data;

the performing feature extraction on the data of at least two different modalities to obtain extracted features, and then splicing or superimposing the extracted features, to obtain a feature sequence, comprises:

collecting ternary text data corresponding to the knowledge graph data; and performing, respectively, word segmentation on the ternary text data and the to-be-processed text data to obtain word segmentation results, and splicing all the word segmentation results to obtain the feature sequence.

13. The non-transitory computer readable medium according to claim 12, wherein the operations further comprise:

determining total position data of respective word segmentation results in the spliced word segmentation results in the feature sequence; and the performing model mapping on the feature sequence, to obtain multi-modal input data adapted to an autoregressive model, comprises:

mapping the feature sequence to a vector adapted to the autoregressive model, to obtain a data feature vector corresponding to the feature sequence;

mapping the total position data to a vector adapted to the autoregressive model, to obtain a total position vector; and adding the data feature vector and the total position vector to obtain the multi-modal input data adapted to the autoregressive model.

14. The non-transitory computer readable medium according to claim 12, wherein the operations further comprise:

classifying respective word segmentation results in the spliced word segmentation results in the feature sequence to obtain total classification data; and the performing model mapping on the feature sequence, to obtain multi-modal input data adapted to an autoregressive model, comprises:

mapping the feature sequence to a vector adapted to the autoregressive model, to obtain a data feature vector corresponding to the feature sequence;

mapping the total classification data to a vector adapted to the autoregressive model, to obtain a total classification vector; and adding the data feature vector and the total classification vector to obtain the multi-modal input data adapted to the autoregressive model.

* * * * *